(12) United States Patent
Hesse et al.

(10) Patent No.: US 6,539,730 B1
(45) Date of Patent: Apr. 1, 2003

(54) METHOD AND DEVICE FOR AIR CONDITIONING THE INTERIOR OF A MOTOR VEHICLE

(75) Inventors: Ullrich Hesse, Affalterbach (DE); Dietmar Steiner, Welzheim (DE); Armin Marko, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/615,137

(22) Filed: Jul. 13, 2000

(30) Foreign Application Priority Data

Jul. 13, 1999 (DE) .......................... 199 32 691

(51) Int. Cl.[7] .................. F25D 17/06; F25D 17/00; F28D 5/00
(52) U.S. Cl. ................. 62/91; 62/333; 62/314
(58) Field of Search .................. 62/310, 314, 332, 62/333, 91, 92

(56) References Cited

U.S. PATENT DOCUMENTS

| | | | | | |
|---|---|---|---|---|---|
| 4,107,942 A | * | 8/1978 | Fairman | ...................... | 62/305 |
| 4,827,733 A | * | 5/1989 | Dinh | .......................... | 62/305 |
| 4,910,971 A | * | 3/1990 | McNab | ...................... | 62/310 |
| 5,056,588 A | * | 10/1991 | Carr | .......................... | 165/10 |
| 5,250,265 A | * | 10/1993 | Kawaguchi et al. | ......... | 422/107 |
| 5,285,654 A | * | 2/1994 | Ferdows | ...................... | 62/309 |
| 5,344,361 A | * | 9/1994 | Matthias | ...................... | 454/129 |
| 5,677,982 A | * | 10/1997 | Levine et al. | ................ | 392/405 |
| 5,722,251 A | * | 3/1998 | Nabiulin et al. | .............. | 62/309 |
| 6,158,225 A | * | 12/2000 | Muto et al. | ................... | 62/3.7 |
| 6,223,545 B1 | * | 5/2001 | Kinkel et al. | .................. | 62/171 |
| 6,290,593 B1 | * | 9/2001 | Weissbrich et al. | ........... | 454/75 |

FOREIGN PATENT DOCUMENTS

DE   196 13 684   10/1997

OTHER PUBLICATIONS

T. Rakoczy, "Kühlung durch Fortluftbefeuchtung bei RLT–Anlagen" [Cooling by humidifying the outgoing air in ventilation and air conditioning systems], Ki Luft—und Kältetechnik 11/94, pp. 545–550.*

G. Heinrich, "Kälteanlagen mit dem Verdunstungseffekt" [Refrigeration systems with an evaporative effect], Ki Luft—und Kältetechnik 2/94, pp. 64–65.*

* cited by examiner

Primary Examiner—William C. Doerrler
(74) Attorney, Agent, or Firm—Kenyon & Kenyon

(57) ABSTRACT

A method and a device for use in the air conditioning of an interior of a motor vehicle equipped with an air conditioning system. In particular, the condensation water, produced when operating the air conditioning system while driving, is collected when the vehicle is standing still, and the intake air supplied to the interior or the outgoing air removed from the interior is humidified with the collected water so that the vehicle is cooled by evaporative cooling when it is standing still. While driving, the outside air intake may be pre-cooled by the cooled outgoing air by using a heat exchanger.

9 Claims, 1 Drawing Sheet

METHOD AND DEVICE FOR AIR CONDITIONING THE INTERIOR OF A MOTOR VEHICLE

FIELD OF THE INVENTION

The present invention relates to a method and a device for air conditioning the interior of a motor vehicle equipped with a conventional air conditioning system, in particular, when the vehicle is at a standstill.

BACKGROUND INFORMATION

Vehicles parked in the sun rapidly reach high interior temperatures, e.g., above 80° C. The interior temperature depends on the size of the vehicle, its color, the color and nature of the interior equipment, the outside temperature, the radiant power of the sun, the permeability and size of the window surfaces (heat source of the passenger space) and the thermal resistance of the vehicle body (heat sink). A high interior temperature reduces driving comfort and leads to increased fuel consumption by the air conditioning system, which is then operating at full load at the start of a trip. In the extreme case, engines of standing vehicles may run for hours to avoid this increase in temperature.

Proposals have been made for the air conditioning of standing vehicles, which may involve using processes based on very complicated equipment such as electric compressors, sorption processes and the like.

There are certain methods for air conditioning buildings, whereby air is cooled by humidifying the air conveyed out of such buildings (see Ki November 1994, pages 545–550: Ki Luft-und Kältetechnik November 1994, T. Rakoczy in "Kühlung durch Fortluftbefeuchtung bei RLT-Anlagen" [Cooling by humidifying the outgoing air in ventilation and air conditioning systems] and Ki February 1994, pages 64–65: Ki Luft-und Kältetechnik, G. Heinrich in "Kälteanlagen mit dem Verdunstungseffekt" [Refrigeration systems with an evaporative effect]). It is believed that one problem with this in the automotive field is the high water consumption, which may necessitate filling up with water, as well as the resulting increased weight and possibly the high air output of the fans.

SUMMARY OF THE INVENTION

An object of an exemplary embodiment of the present invention is to permit simple and inexpensive interior air conditioning that does not require much additional energy consumption, in particular, for a standing vehicle (when the engine is not running) in such a way as to permit air conditioning that does not place a burden on the electrical system of the vehicle and can keep the temperature in the interior of a parked vehicle at least in the range of the outside temperature level, or better yet, even lower.

The object may be achieved by using a method that involves the evaporative cooling of water, which is an adiabatic process with air. In humidifying air without any input or output of external energy, there is a shift in the sensible and latent components of the total enthalpy of air, i.e., the absolute atmospheric humidity of the air increases while there is a simultaneous drop in temperature.

From a technical standpoint, this process can be used in two ways: either the outside air intake can be humidified and thus cooled, or as an alternative, the outgoing and therefore hot air from the interior can be humidified and cooled. This can then pre-cool the outside air intake by way of a heat exchanger.

A method according to an exemplary embodiment of the present invention for air conditioning the interior of a motor vehicle equipped with a conventional air conditioning system, in particular, when the vehicle is at a standstill, involves collecting the water of condensation produced in operation of the air conditioning system while driving, and using the collected water to humidify the intake air supplied to the interior or the outgoing air removed from the interior. Thus, when the vehicle is standing still, it is cooled by evaporative cooling, and while driving, the outside air intake may be pre-cooled by the cooled outgoing air by using a heat exchanger.

In an exemplary embodiment of the method according to the present invention, the intake air supplied to the interior of the motor vehicle or the outgoing air removed from it is also overdried by air drying before being humidified.

The water stored in air drying can be expelled thermally and added to the water used for evaporative cooling.

The total water consumption or the cooling power of the "standing cooling" can be controlled and/or regulated optimally as a function of certain parameters such as the outside temperature, the desired interior temperature, the amount of water collected from the air conditioning system and characteristic values of the motor vehicle, for example.

A water reservoir may be provided to supplement the water collected from the air conditioning system in certain situations.

An arrangement for carrying out the exemplary method and achieving the object, as defined above, includes a humidifying turbine provided in an air duct, through which air is supplied to or removed from the interior. The water of condensation collected from the conventional air conditioning system and/or water from the reservoir is sprayed in a fine jet onto the rapidly rotating turbine wheel in the humidifying turbine so that it is thrown outward centrifugally, atomized to fine droplets and vaporized. Unevaporated water can be collected in the worm gear of the humidifying turbine and returned to the process.

The device according to an exemplary embodiment of the present invention may also include a control unit (operatively connected or coupled to the water and coolant circuits) for optimally controlling and/or regulating the total water consumption or the cooling power of the "standing cooling" as a function of certain parameters such as the outside temperature, the desired interior temperature, the amount of water collected and characteristic values of the motor vehicle.

The control unit may be operatively connected or coupled to a remote control unit or a programming unit for selecting certain process variables and/or process sequences of evaporative cooling.

DETAILED DESCRIPTION

Figure 1:
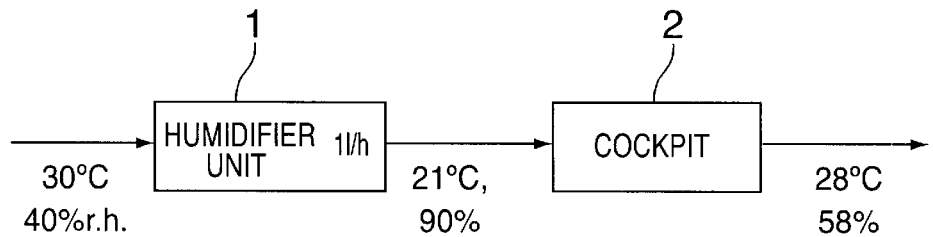
FIG. 1 schematically shows function blocks of an exemplary embodiment of a method according to the present invention in which an intake air flow is directly humidified, together with a respective temperature and atmospheric humidity.

An exemplary embodiment of the method according to the present invention is illustrated in FIG. 1 in the form of function blocks. In this embodiment, the intake air drawn into the interior of a vehicle, having a relative humidity of 40%, at 30° C., for example, is humidified in a humidifier unit 1 with a humidifying capacity of 1 L/h, thereby lowering the temperature of the air in the humidifier unit to 21° C. and increasing its humidity to 90%. The interior temperature which can thus be achieved in the cockpit is 28° C. at a relative humidity of 58%. The heat input here amounts to 500 W, and the air throughput is 240 kg/h.

Figure 2:
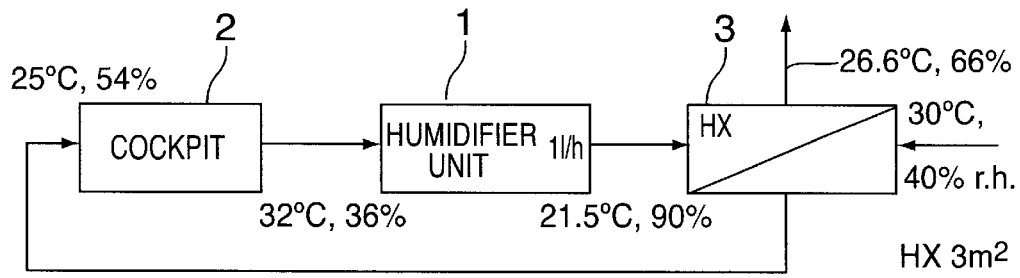
FIG. 2 schematically shows function blocks of another exemplary embodiment of the method according to the present invention in which an exhaust air flow is humidified and then the intake air flow is cooled.

In an exemplary embodiment according to the present invention illustrated in FIG. 2, the air vented from cockpit 2 is humidified by using water collected from the conventional air conditioning system in a humidifier unit 1 with a humidifying capacity of 1 L/h and is thereby cooled. Then the air cooled in humidifier unit 1 is used in a heat exchanger 3 to pre-cool the air intake from the exterior. The effective area of heat exchanger 3 is 3 m². The outside conditions in the alternative embodiment illustrated in FIG. 2 are the same as those in the embodiment illustrated in FIG. 1, i.e., the incoming air has a temperature of 300° C. and a relative humidity of 40%. The intake air pre-cooled in heat exchanger 3 has a temperature of 25° C. and a relative humidity of 54%. Thus, a temperature of 32° C. is reached in cockpit 2 at 36% relative humidity. The temperature of the outgoing air removed from the cockpit and cooled by humidifier unit 1 is 21.5° C. at 90% relative humidity, and the air discharged into the environment has a temperature of 26.6° C. at 66% relative humidity. The air output is 240 kg/h and the heat input is 500 W, as with the system illustrated in FIG. 1.

The efficiency of the types of humidification performed in FIGS. 1 and 2 can be further increased with an air dryer (not shown) connected upstream from the humidifier by using absorption mechanisms with silica gel or zeolite. The moisture stored there can be expelled thermally, e.g., through the waste heat of the engine, through the exhaust, through standing heating, electrically or through thermal contact with the hot exterior of the motor vehicle.

Figure 3:
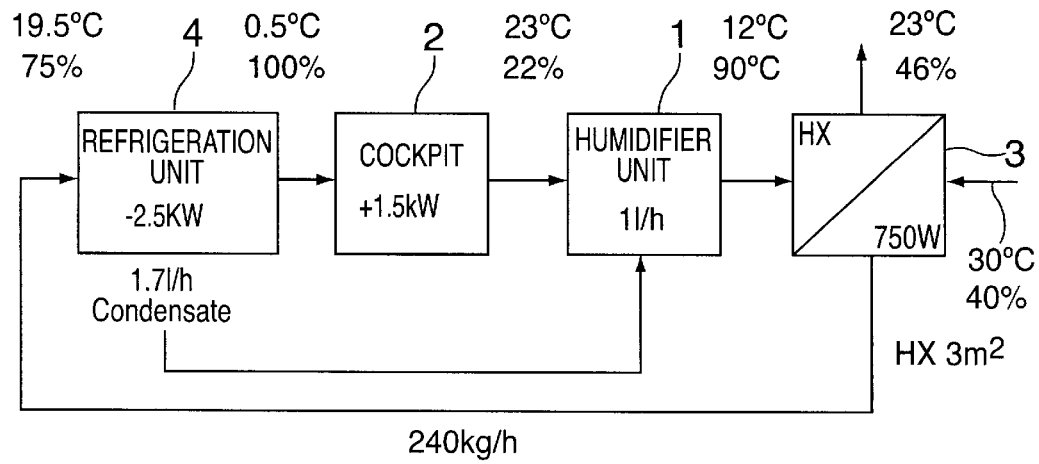
FIG. 3 schematically shows function blocks of another exemplary embodiment of the method according to the present invention in which evaporative cooling is additionally used to support a conventional air conditioning system in a motor vehicle while driving.

FIG. 3 schematically shows function blocks of another exemplary embodiment of the method according to the present invention, in which the standing cooling system according to an exemplary embodiment of the present invention is also used while driving to support the conventional air conditioning system. In FIG. 3, the overdried outgoing air from cockpit 2 of the motor vehicle is rehumidified in humidification of the outgoing air in a humidifier unit 1. It pre-cools the intake air, arriving at 30° C. and 40% relative humidity, to 19.5° C. at 75% relative humidity through a downstream heat exchanger 3, thereby reducing the power consumption of refrigeration unit 4 by 20–25%.

In FIG. 3, the heat load of the driving vehicle is 1500 W. FIG. 3 also illustrates the respective temperatures and the relative humidity of the intake air, the exhaust air, the air flow upstream from refrigeration unit 4, the air flowing from refrigeration unit 4 into cockpit 2, the air flowing from cockpit 2 into humidifier unit 1, and the air flowing into heat exchanger 3 from humidifier unit 1. The air output is 240 kg/h.

For humidifier unit 1 of the above exemplary embodiments according to the present invention, it is believed that established humidifying mechanisms may be used such as, for example, disk atomizers, nozzles, wetted surfaces and the like. Using a humidifying turbine may also be advantageous. In the humidifying turbine, the water collected from the conventional air conditioning system and/or water from the reservoir is sprayed in a fine jet onto the rapidly rotating turbine impeller. In the process, it is thrown outward centrifugally, atomized to form a fine aerosol and vaporized. Unevaporated water can be collected in the worm gear of the humidifying turbine and reused.

A control unit (not shown) may be designed for optimizing control and/or regulation of the total water consumption or the cooling power of the standing cooling as a function of certain parameters such as, for example, the outside temperature, the actual temperature in the cockpit, the desired cockpit temperature, the amount of water collected from the air conditioning system and characteristic values of the motor vehicle. A programming unit or remote control unit may be operatively connected or coupled with the control unit for selecting certain process variables and/or process sequences of evaporative cooling. A solar-operated fan may also be used in combination to provide "standing ventilation" of the interior.

Development of an odor or problematical flora or fauna in the water reservoir where the water of condensation of the air conditioning system is collected can be prevented by ultraviolet sterilization, by heating to more than 60° C. in the reservoir and/or by adding chemicals.

In summary, the exemplary method according to the present invention, may involve collecting water of condensation generated in a conventional air conditioning system from dehumidification of air and using this water by evaporative cooling to humidify the air intake into the interior or the outgoing air, and may be used not only with vehicles but also with stationary systems such as building ventilation and air conditioning systems.

What is claimed is:

1. A method for air conditioning an interior of a motor vehicle having an air conditioning system, the method comprising the steps of:
   collecting water from condensation to provide collected water, wherein the condensation is produced by the air conditioning system operating while the motor vehicle is being operated; and
   when an engine of the motor vehicle is not running, performing at least one of:
      humidifying intake air supplied to the interior of the motor vehicle from outside the motor vehicle with the collected water from condensation, wherein the step of humidifying cools the intake air by evaporative cooling; and
      humidifying the outgoing air removed from the interior of the motor vehicle with the collected water from condensation, wherein the step of humidifying the outgoing air provides cooled outgoing air for pre-cooling intake air supplied to the interior of the motor vehicle from outside the motor vehicle using a heat exchanger.

2. The method of claim 1, wherein the method is used when the engine of the motor vehicle is not running.

3. The method of claim 1, further comprising the step of overdrying by air drying at least one of the intake air and the outgoing air before performing at least one of humidifying the intake air and humidifying the outgoing air.

4. The method of claim 3, further comprising the steps of:
   thermally expelling water associated with the step of overdrying to provide thermally expelled water; and adding the thermally expelled water to the collected water used to provide the evaporative cooling.

5. The method of claim 1, further comprising the step of performing at least one of controlling and regulating optimally at least one of a total water consumption and a cooling power of a standing cooling as a function of at least one of an outside temperature, a desired interior temperature, an amount of the collected water and characteristic values of the motor vehicle.

6. The method of claim 1, further comprising the step of providing additional water from a water reservoir to supplement the collected water.

7. The method of claim 3, wherein:
the intake air is pre-cooled using the heat exchanger; and
the step of overdrying includes overdrying the outgoing air before humidifying the outgoing air.

8. The method of claim 1, wherein a solar-operated fan is used to provide ventilation to the interior of the motor vehicle.

9. The method of claim 1, wherein the collected water is subjected to at least one of an ultraviolet sterilization and heating to more than 60° C.

* * * * *